United States Patent [19]

Takeuchi et al.

[11] Patent Number: 5,443,928
[45] Date of Patent: Aug. 22, 1995

[54] CARBON ELECTRODE FOR A NONAQUEOUS SECONDARY ELECTROCHEMICAL CELL

[75] Inventors: Esther S. Takeuchi; Randolph A. Leising, both of Williamsville, N.Y.

[73] Assignee: Wilson Greatbatch Ltd., Clarence, N.Y.

[21] Appl. No.: 199,891

[22] Filed: Feb. 18, 1994

[51] Int. Cl.$^6$ ............................................. H01M 4/58
[52] U.S. Cl. .................................. 429/218; 429/209; 429/212
[58] Field of Search ..................... 429/218, 209, 212

[56] References Cited

U.S. PATENT DOCUMENTS

| | | | |
|---|---|---|---|
| 5,028,500 | 7/1991 | Fong et al. | 429/194 |
| 5,030,529 | 7/1991 | Wada et al. | 429/209 |
| 5,069,683 | 12/1991 | Fong et al. | 429/218 |
| 5,196,279 | 3/1993 | Tarascon | 429/194 |

*Primary Examiner*—John Niebling
*Assistant Examiner*—Bruce F. Bell
*Attorney, Agent, or Firm*—Hodgson, Russ, Andrews, Woods & Goodyear

[57] ABSTRACT

A new anode material known as "hairy carbon" for use in a secondary electrochemical cell, is described. The hairy carbon electrode material is developed by growing submicron carbon filaments on a carbon substrate. A catalyst is used to initiate hair growth with carbonaceous gases serving as the carbon source. The hairy carbon submicron filaments typically have diameters ranging between about 0.05 $\mu$m and 0.2 $\mu$m, and the electrode is formed by mixing the hairy carbon material with a suitable binder and pressing the admixture into a desired shape. Hairy carbon is particularly useful as an anode material in a rechargeable alkali metal electrochemical cell due to its excellent reversibility for the intercalation and deintercalation of alkali metal ions over extended discharge and recharge cycles.

74 Claims, 1 Drawing Sheet

5,443,928

CARBON ELECTRODE FOR A NONAQUEOUS SECONDARY ELECTROCHEMICAL CELL

BACKGROUND OF THE INVENTION

1. Field of the Invention

This invention relates to the art of electrochemical cells, and more particularly to a new carbonaceous material that is useful as a negative electrode in a rechargeable, secondary electrochemical cell. 2. Prior Art Carbonaceous materials are known for use as electrodes in electrochemical cells due to their high conductivity and gross pore structure. Carbon also exhibits a high capacity for the intercalation and deintercalation of alkali metal ions over extended cycles. This has resulted in carbon electrodes being used extensively in rechargeable, secondary cells.

U.S. Pat. Nos. 5,028,500 and 5,069,683 to Fong et al. describe the use of a carbonaceous electrode in a rechargeable, electrochemical cell comprising an alkali metal, a first electrode intercalatable with the alkali metal, a counterelectrode capable of reversibly incorporating the alkali metal, and a suitable electrolyte. The carbonaceous electrode preferably serves as the counterelectrode and comprises a particulate composition including carbon, such as graphite or coke, and an electrically conductive filamentary material, such as carbon black interspersed with the carbon-containing composition. In one embodiment of a reversible electrochemical cell, the alkali metal is initially positioned in an electrically connected and layered relationship with the carbonaceous electrode serving as the counterelectrode or anode. The alkali metal, such as lithium, intercalates into the carbonaceous electrode in a lithiation process to saturate the anode and the cell then discharges in a normal manner.

A second embodiment of this secondary cell comprises the carbonaceous electrode serving as the anode and the cathode having lithium incorporated therein. The cell is in a discharged state when first assembled so that applying an externally generated electrical potential recharges the cell by drawing lithium from the cathode material and through the electrolyte to intercalate into the carbonaceous anode.

U.S. Pat. No. 5,030,529 to Wada et al. discloses a carbon electrode for rechargeable electrochemical cells comprising first and second carbon layers. The first carbon layer is described as containing an iron-family element, such as nickel. The first carbon layer is formed by vapor pyrolytic deposition of a hydrocarbon compound such as propane, benzene and the like, at about 400° C. to 1,300° C. to deposit carbon onto either a nickel substrate or on a fine nickel powder. The second carbon layer is free from any iron-family elements and is formed over the surface of the first layer by using vapor deposition with a higher concentration of evaporated hydrocarbon to increase the deposition rate.

There is thus needed a new electrode material that exhibits a higher capacity for the intercalation of alkali metal ions than previously known carbonaceous electrode materials and which is characterized by excellent reversibility for the intercalation and deintercalation of the alkali metal ions over extended discharge and recharge cycles.

SUMMARY OF THE INVENTION

The electrode material of the present invention comprises a new material referred to as "hairy carbon" This hairy carbon material is developed by growing submicron carbon filaments on a conventional carbon substrate. A catalyst is used to initiate hair growth with a carbonaceous gas serving as the carbon source. The electrode material of the present invention advantageously serves as the negative electrode or anode in an electrochemical cell.

DETAILED DESCRIPTION OF THE INVENTION

Figure 1:
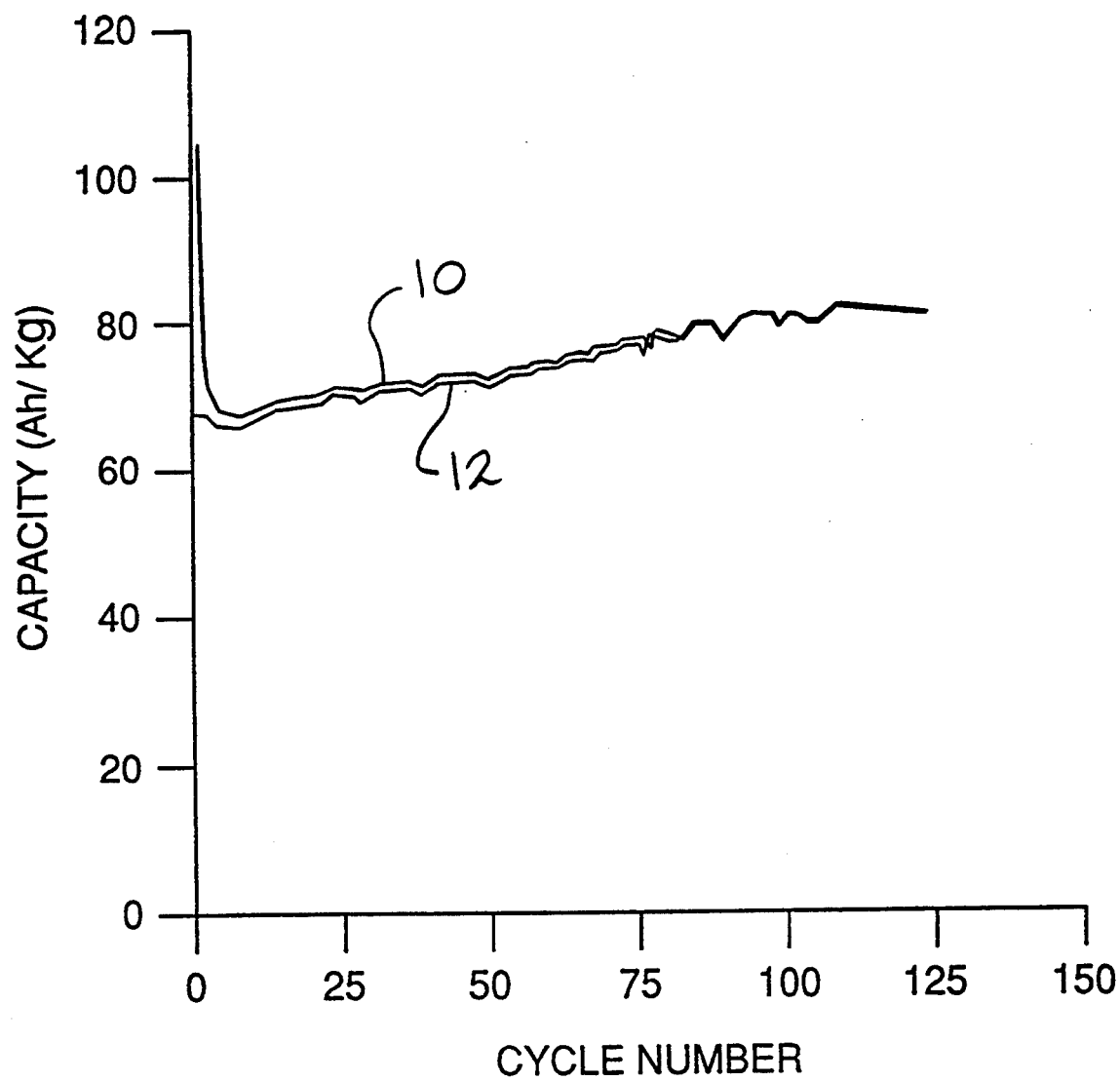
FIG. 1 is a graph showing discharge curves 10 and recharge curves 12 over extended cycles for a nonaqueous hairy carbon/Li electrochemical cell.

The new electrode material of the present invention comprises "hairy carbon" developed by growing submicron carbon filaments on a conventional carbon substrate. The submicron filaments typically have diameters ranging between about 0.05 μm to about 0.2 μm. Typical substrate materials include carbon black, graphite powder, carbon fibers and glassy carbon. A catalyst is used to initiate hair growth with carbonaceous gases serving as the carbon source. Materials that are suitable for use as a catalyst to promote hairy carbon growth include oxides of the transition metals, preferably cobalt-containing materials such as cobalt oxide and iron complexes, such as ferrocene and iron pentacarbonyl. However, this list is not meant to be exhaustive, and other catalysts known to those of ordinary skill in the art may be readily apparent for this purpose.

The hairy carbon material of the present invention is not similar to conventional carbon fibers or carbon filaments. Whereas hairy carbon is catalytically grown from carbonaceous gases, carbon fibers are typically prepared either from a pitch material or from a polymer precursor such as polyacrylonitrile. However, in contrast to hairy carbon, carbon fibers have diameters on the order of about 10 μm.

Carbon filaments, like hairy carbon, are submicron in nature, typically having diameters of about 0.2 μm, and are catalytically grown from carbonaceous source gases. However, carbon filaments are very long and tend to cling to each other in a similar manner as cotton and wool. Consequently, dispersion and mixing of carbon filaments with binder materials and conductive diluents is very difficult.

Since hairy carbon is produced on particulate carbon substrates, the particulate nature of the finished product is preserved. Also, the length of hairy carbon is controllable so that hair short enough to resemble nodules is known. This benefits the dispersion and mixing of hairy carbon with conductive diluents, such as carbon black and graphite, and a powder fluoro-resin such as polytetrafluoroethyleye powder as a binder material to form a depolarizer admixture that can be pressed into a desired shape for use as an electrode in an electrochemical cell. The thusly formed electrode preferably comprises between about 80 weight percent to about 99 weight percent of the hairy carbon active material.

Hairy carbon can serve as either electrode, but it is particularly useful as an anode material in a rechargeable alkali metal electrochemical cell due to its excellent reversibility for the intercalation and deintercalation of alkali metal ions over extended discharge and recharge cycles. In this case, the cell is initially in a discharged state and the alkali metal, such as lithium, comprising the cathode is intercalated into the hairy carbon anode by applying an externally generated electrical potential to recharge the cell. The applied recharging electrical potential serves to draw the alkali metal from the cathode material, through the electrolyte and into the hairy carbon to saturate the hairy carbon comprising the anode. The cell is then provided with an electrical potential and is discharged in a normal manner.

The electrochemical cell system of the present invention is particularly useful where the cathode comprises a lithiated material that is stable in air and readily handled. Examples of such air-stable lithiated cathode materials include lithiated nickel oxide, lithiated manganese oxide, lithiated cobalt oxide and lithiated mixed oxides of cobalt with nickel or tin. The more preferred oxides include $LiNiO_2$, $LiMn_2O_4$, $LiCoO_2$, $LiCo_{0.92}Sn_{0.08}O_2$ and $LiCO_{1-x}Ni_xO_2$.

Hairy carbon as an anode material is therefore useful in a nonaqueous electrochemical cell having a wide variety of physical configurations, including a spiral wound structure similar to a "jellyroll." An electrochemical cell having the hairy carbon anode preferably comprises a lithiated cathode body having a separator provided therebetween that is chemically unreactive with both the hairy carbon comprising the anode, the cathode assembly and the nonaqueous electrolyte solution. Suitable materials for such a separator include nonwoven glass, porous polytetrafluoroethylene or polypropylene membranes, glass fiber materials, ceramics and materials commercially available under the trademarks ZITEX (Chemoplast Inc.), CELGARD (Celanese Plastic Co. Inc.) and DEXIGLAS (C. H. Dexter Div. Dexter Corp.), that isolate the active components from each other without impending the free flow of ions therethrough.

Suitable nonaqueous electrolyte solutions that are useful with the hairy carbon anode, preferably comprise a combination of a lithium salt and an organic solvent. The lithium salt can include either alone or in combination $LiCF_3SO_3$, $LiBF_4$, $LiClO_4$, $LiAsF_6$, $LiPF_6$, and $Li_2O$ and the solvent can include propylene carbonate, dimethoxyethane, gamma-butyrolactone, two-methyl-tetrahydrofuran, dimethyl sulfoxide, methyl formate ethylene carbonate and diethyl carbonate. Suitable solvent concentrations typically range between about 1.0 to 1.2 molar and a preferred solvent mixture is typically 50:50 volume:volume PC:DME. In the case of the jellyroll cell configuration, both the hairy carbon anode and the cathode can be provided with respective current collectors, or the anode current collector can be eliminated and the hairy carbon anode material may be incorporated in a button-type cell with the casing serving as the anode current collector in a case-negative cell design.

An alternate way of using hairy carbon as an anode is to intercalate the hairy carbon with the active alkali material before the anode is incorporated into the cell. In this case, the cathode body can be solid and comprise, but not be limited to, such materials as manganese dioxide, silver vanadium oxide, titanium disulfide, copper oxide, copper sulfide, iron sulfide, iron disulfide and fluorinated carbon, or the electrochemical cell can comprise a liquid depolarizer/catholyte, such as sulfur dioxide or oxyhalides including phosphoryl chloride, thionyl chloride and sulfuryl chloride used individually or in combination with each other or in combination with halogens and interhalogens, such as bromine trifluoride, or other electrochemical promoters or stabilizers. However, this approach is compromised by the problems associated with handling lithiated carbon outside of the cell. Lithiated carbon tends to react with explosive results when contacted by air.

Benefits realized from use of hairy carbon as an electrode material in an electrochemical cell are illustrated further by the following examples.

EXAMPLE I

An experimental cell was built to test the ability of hairy carbon to intercalate and deintercalate alkali metal ions. The hairy carbon was mixed with 10% by weight of poly(vinylidene fluoride) binder (PVDF) dissolved in N,N-dimethylformamide (DMF) solvent to form a slurry. The hairy carbon/PVDF slurry was spread on Ni foil and heated to about 105° C. for about 15 minutes to evaporate the DMF solvent. The dry electrode material was then pressed at about 1700 lbs/in$^2$ and cut into a disk having a diameter of about 1.10 cm and a thickness of about 0.018 cm. The hairy carbon electrode in this cell served as the positive electrode and was placed in contact with a metal current collector and polypropylene separator. Lithium metal (1.10 cm diameter, 0.08 cm thick), also in contact with a metal current collector served as the anode and was placed on the opposite side of the separator facing the hairy carbon. Both electrodes were held between metal rods housed in an inert polymer T-shaped tube. The cell was filled with 1M $LiAsF_6$ in PC/DME electrolyte and capped under an argon atmosphere.

The voltage vs time profile of this electrochemical cell was monitored with the test cell being discharged at a constant current (0.95 mA/cm$^2$) down to a voltage of $+0.08$ V vs Li/Li$^+$, corresponding to the intercalation of the Li into the hairy carbon material. The cell was then charged to a voltage of 1.5 V, resulting in the deintercalation of lithium. The hairy carbon sample displayed high current capacity with an average value of 75 Ah/kg for a total number of at least 125 cycles. As shown in FIG. 1, the very similar lengths of time for the charge and discharge cycles illustrates that the intercalation of lithium into hairy carbon is very reversible. This is indicated by the curve designated 10 which represents the discharge cycles of this electrochemical cell during intercalation of the lithium into the hairy carbon electrode material and the curve designated 12 which represents the charge cycles during deintercalation of lithium. The hairy carbon also displayed very long cycle life, wherein the cell was cycled 1400 times while maintaining greater than 50% of the original capacity.

Although the hairy carbon material in this example is used as a cathode, the results of EXAMPLE I are equally applicable to use of hairy carbon as an anode material to show the superior ability for hairy carbon to intercalate and deintercalate alkali metal ions in a rechargeable secondary electrochemical cell. This is clearly shown in the next example.

EXAMPLE II

An experimental cell was built to test the ability of hairy carbon to act as an anode material in a nonaqueous secondary electrochemical cell. The hairy carbon was mixed with 10% by weight of PVDF binder dissolved in DMF solvent to form a slurry. The hairy carbon/PVDF slurry was spread on Ni foil, heated to evaporate the DMF solvent and pressed as previously described in EXAMPLE I. The hairy carbon electrode, with a diameter of about 0.6 cm and a thickness of about 0.018 cm, served as the negative electrode in the cell.

The hairy carbon electrode was placed in contract with a metal current collector and polypropylene separator. The positive electrode consisted of $LiCoO_2$ combined with 3% by weight PTFE and 3% by weight carbon black. The $LiCoO_2$ electrode (0.6 cm diameter, 0,025 cm thick), also in contact with a metal current collector was placed on the opposite side of the separator facing the hairy carbon. Both electrodes were held between metal rods housed in an inert polymer T-shaped tube. The cell was filled with 1M $LiPF_6$ in ethylene carbonate/diethyl carbonate (EC/DEC) electrolyte and capped under an argon atmosphere. The initial open circuit voltage of the test cell was about 0.0 V.

The voltage vs time profile of this electrochemical cell was monitored with the test cell being initially charged at a constant current (0.21 $mA/cm^2$) up to a voltage of +3.5 V vs $Li/Li^+$, corresponding to the intercalation of Li into the hairy carbon material and deintercalation of Li out of the $LiCoO_2$ electrode. The cell was then discharged to a voltage of +2.75 V, resulting in the deintercalation of Li from the hairy carbon and intercalation of Li back into the $LiCoO_2$ material. The hairy carbon sample displayed consistent current capacity with an average value of 30 Ah/kg for 20 cycles. The voltage limit for charging of the test cell was then changed to +4.1 V vs $Li/Li^+$, and the voltage vs time profile of the test cell was monitored as before. Under these conditions the hairy carbon displayed very high current capacity with a value of 580 Ah/kg on the initial charge step, and 360 Ah/kg on the initial discharge step.

These capacity values compare favorably with those recorded for a prior art test cell constructed using the same $LiCoO_2$/PTFE/carbon black material as the positive electrode and petroleum coke/PVDF (10% by weight) as the negative electrode. This comparative test cell was charged to +4.1 V and discharged to +2.75 V vs $Li/Li^+$ as described previously. The petroleum coke displayed a much lower current capacity with a value of 130 Ah/kg on the initial charge step, and 110 Ah/kg on the initial discharge step.

It is appreciated that various modifications to the present inventive concepts described herein may be apparent to those of ordinary skill in the art without departing from the spirit and scope of the present invention as defined by the appended claims.

What is claimed is:

1. An electrochemical cell, which comprises:
   (a) a positive electrode which intercalate with an alkali metal;
   (b) a negative electrode comprising submicron carbon filaments which intercalate with the alkali metal; and
   (c) an electrolyte operatively associated with the electrodes.

2. The electrochemical cell of claim 1 wherein the submicron carbon filaments are formed on a preparation substrate.

3. The electrochemical cell of claim 2 wherein the preparation substrate is of a carbonaceous material.

4. The electrochemical cell of claim 2 wherein the preparation substrate is selected from the group consisting of carbon black, graphite powder, carbon fibers, glassy carbon, and mixtures thereof.

5. The electrochemical cell of claim 2 wherein the submicron carbon filaments are characterized as having been catalytically grown on the preparation substrate from a stream of carbonaceous gases directed against the preparation substrate.

6. The electrochemical cell of claim 5 wherein the catalyst is a transition metal oxide.

7. The electrochemical cell of claim 6 wherein the catalyst is selected from the group consisting of cobalt oxide, ferrocene and iron pentacarbonyl.

8. The electrochemical cell of claim 1 wherein the submicron carbon filaments have diameters in a range of between about 0.05 μm to about 0.2 μm.

9. The electrochemical cell of claim 1 wherein the submicron carbon filaments are in the form of nodules.

10. The electrochemical cell of claim 1 wherein the alkali metal is lithium.

11. The electrochemical cell of claim 1 wherein the negative electrode comprising the submicron carbon filaments includes a binder material.

12. The electrochemical cell of claim 1 wherein the negative electrode comprises from between about 80 weight percent to about 99 weight percent of the submicron carbon filaments.

13. The electrochemical cell of claim 1 wherein the positive electrode comprises a lithiated cathode material.

14. The electrochemical cell of claim 1 wherein the positive electrode is selected from the group consisting of lithiated nickel oxide, lithiated manganese oxide, lithiated cobalt oxide, lithiated mixed oxides of cobalt with nickel or tin, and mixtures thereof.

15. An electrochemical cell, which comprises:
    (a) a positive electrode comprising lithium;
    (b) a negative electrode comprising submicron carbon filaments which intercalate with lithium; and
    (c) an electrolyte operatively associated with the positive and negative electrodes.

16. The electrochemical cell of claim 15 wherein the submicron carbon filaments are formed on a preparation substrate.

17. The electrochemical cell of claim 16 wherein the preparation substrate is of a carbonaceous material.

18. The electrochemical cell of claim 16 wherein the preparation substrate is selected from the group consisting of carbon black, graphite powder, carbon fibers, glassy carbon, and mixtures thereof.

19. The electrochemical cell of claim 16 wherein the submicron carbon filaments are characterized as having been catalytically grown on the preparation substrate from a stream of carbonaceous gases directed against the preparation substrate.

20. The electrochemical cell of claim 19 wherein the catalyst is a transition metal oxide.

21. The electrochemical cell of claim 20 wherein the catalyst is selected from the group consisting of cobalt oxide, ferrocene and iron pentacarbonyl.

22. The electrochemical cell of claim 15 wherein the submicron carbon filaments have diameters in a range of between about 0.05 μm to about 0.2 μm.

23. The electrochemical cell of claim 15 wherein the submicron carbon filaments are in the form of nodules.

24. The electrochemical cell of claim 15 wherein the negative electrode comprising the submicron carbon filaments includes a binder material.

25. The electrochemical cell of claim 15 wherein the negative electrode comprises from between about 80 weight percent to about 99 weight percent of the submicron carbon filaments.

26. The electrochemical cell of claim 15 wherein the positive electrode comprises a lithiated cathode material.

27. The electrochemical cell of claim 25 wherein the positive electrode is selected from the group consisting of lithiated nickel oxide, lithiated manganese oxide, lithiated cobalt oxide, lithiated mixed oxides of cobalt with nickel or tin, and mixtures thereof.

28. An anode for a rechargeable electrochemical cell, the anode comprising:
   (a) an anode active material of submicron carbon filaments which intercalate with alkali metal ions wherein the submicron carbon filaments are characterized as having been catalytically grown on a preparation substrate from a stream of carbonaceous gases directed against the preparation substrate; and
   (b) an electrical conductor means operatively associated with the anode active material.

29. The anode of claim 28 wherein the preparation substrate is of a carbonaceous material.

30. The anode of claim 29 wherein the substrate is selected from the group consisting of carbon black, graphite powder, carbon fibers, glassy carbon, and mixtures thereof.

31. The anode of claim 28 wherein the catalyst is a transition metal oxide.

32. The anode of claim 31 wherein the catalyst is selected from the group consisting of cobalt oxide, ferrocene and iron pentacarbonyl.

33. The anode of claim 28 wherein the submicron carbon filaments have diameters in a range of between about 0.05 $\mu$m to about 0.2 $\mu$m.

34. The anode of claim 28 wherein the submicron carbon filaments are in the form of nodules.

35. The anode of claim 28 wherein the alkali metal is lithium.

36. The anode of claim 28 wherein the submicron carbon filaments further comprise a binder material.

37. The anode of claim 28 wherein the submicron carbon filaments comprise from between about 80 weight percent to about 99 weight percent of the anode active material.

38. The anode of claim 28 incorporated into the rechargeable electrochemical cell that is initially in a discharged state and wherein the alkali metal ions are intercalatable into the submicron carbon filaments from a cathode by an externally generated electrical potential to thereby provide the cell with an electrical potential that is dischargeable to provide electrical energy.

39. A method for making an electrode for use in an electrochemical cell, comprising the steps of:
   (a) providing a preparation substrate;
   (b) directing a stream of carbonaceous gases against the preparation substrate and thereby causing growth of submicron carbon filaments on the preparation substrate, wherein the submicron carbon filaments are intercalate with an alkali metal; and
   (c) forming the submicron carbon filaments into the electrode having a chosen shape.

40. The method of claim 39 wherein the submicron carbon filaments are grown on the preparation substrate with the aid of a catalyst provided in the stream of carbonaceous gases.

41. The method of claim 39 wherein the catalyst is a transition metal oxide.

42. The method of claim 41 wherein the catalyst is selected from the group consisting of cobalt oxide, ferrocene and iron pentacarbonyl.

43. The method of claim 39 wherein the preparation substrate is of a carbonaceous material.

44. The method of claim 40 wherein the preparation substrate is selected from the group consisting of carbon black, graphite powder, carbon fibers, glassy carbon, and mixtures thereof.

45. The method of claim 39 wherein the submicron carbon filaments have diameters in a range of between about 0.05 $\mu$m to about 0.2 $\mu$m.

46. The method of claim 39 wherein the submicron carbon filaments are in the form of nodules.

47. The method of claim 39 wherein the alkali metal is lithium.

48. The method of claim 39 including the step of forming a slurry of the submicron carbon filaments that were initially grown on the preparation substrate, followed by heating the slurry to form an anhydrous mixture of the submicron carbon filaments, and wherein the anhydrous mixture of submicron carbon filaments is then formed into the chosen shape of the electrode.

49. The method of claim 48 wherein the step of heating the slurry to form the anhydrous mixture of the submicron carbon filaments comprises baking the slurry at a temperature of between about 80° C. to about 120° C. for between about 0.1 to about 2.0 hours.

50. The method of claim 49 wherein the slurry is heated on nickel foil.

51. The method of claim 39 wherein the step of forming the negative electrode comprises the addition of a binder material.

52. The method of claim 39 wherein forming the electrode comprises the step of pressing the submicron carbon filaments into the chosen shape.

53. The method of claim 39 wherein the submicron carbon filaments comprise a negative electrode and the electrochemical cell further includes a positive electrode comprising the alkali metal and an electrolyte operatively associated with the positive and negative electrodes with the electrochemical cell initially in a discharged state, and wherein including an additional step of intercalating the alkali metal into the submicron carbon filaments comprising the negative electrode by applying an externally generated electrical potential to the cell to thereby provide the cell with an electrical potential that is discharged to provide electrical energy.

54. An electrochemical cell, which comprises:
   (a) a negative electrode comprising submicron carbon filaments initially intercalated with an alkali metal;
   (b) a positive electrode which intercalates with the alkali metal; and
   (c) an electrolyte operatively associated with the positive and negative electrodes.

55. The electrochemical cell of claim 54 wherein the submicron carbon filaments are formed on a preparation substrate.

56. The electrochemical cell of claim 55 wherein the preparation substrate is of a carbonaceous material.

57. The electrochemical cell of claim 56 wherein the preparation substrate is selected from the group consisting of carbon black, graphite powder, carbon fibers, glassy carbon, and mixtures thereof.

58. The electrochemical cell of claim 55 wherein the submicron filaments are characterized as having been catalytically grown on the preparation substrate from a stream of carbonaceous gases directed against the preparation substrate.

59. The electrochemical cell of claim 58 wherein the catalyst is a transition metal oxide.

60. The electrochemical cell of claim 59 wherein the catalyst is selected from the group consisting of cobalt oxide, ferrocene and iron pentacarbonyl.

61. The electrode of claim 55 wherein the preparation substrate is of a carbonaceous material.

62. The electrode of claim 61 wherein the preparation substrate is selected from the group consisting of carbon black, graphite powder, carbon fibers, glassy carbon, and mixtures thereof.

63. The electrochemical cell of claim 54 wherein the submicron carbon filaments have diameters in a range of between about 0.05 $\mu$m to about 0.2 $\mu$m.

64. The electrochemical cell of claim 54 wherein the submicron carbon filaments are in the form of nodules.

65. The electrochemical cell of claim 54 wherein the alkali metal is lithium.

66. The electrochemical cell of claim 54 wherein the positive electrode is of a solid material selected from the group consisting of manganese dioxide, silver vanadium oxide, titanium disulfide, copper oxide, copper sulfide, iron sulfide, iron disulfide and fluorinated carbon.

67. The electrochemical cell of claim 54 wherein the positive electrode comprises a liquid catholyte selected from the group consisting of sulfur dioxide and an oxyhalide including phosphoryl chloride, thionyl chloride and sulfuryl chloride used individually and in combination with each other and in combination with halogens, interhalogens and other electrochemical promoters and stabilizers.

68. An electrode for an electrochemical cell, which comprises:
   a) an electrode active material comprising submicron carbon filaments which intercalate with alkali metal ions wherein the submicron carbon filaments are characterized as having been catalytically grown on a preparation substrate from a stream of carbonaceous gases directed against the preparation substrate; and
   b) an electrical conduction means operatively associated with the electrode active material.

69. The electrode of claim 68 wherein the submicron carbon filaments are characterized as having been catalytically grown on the preparation substrate from a stream of carbonaceous gases directed against the preparation substrate.

70. The electrode of claim 69 wherein the catalyst is a transition metal oxide.

71. The electrode of claim 69 wherein the catalyst is selected from the group consisting of cobalt oxide, ferrocene and iron pentacarbonyl.

72. The electrode of claim 68 wherein the submicron carbon filaments have diameters in a range of between about 0.05 $\mu$m to about 0.2 $\mu$m.

73. The electrode of claim 68 wherein the submicron carbon filaments are in the form of nodules.

74. The electrode of claim 68 wherein the submicron carbon filaments comprises from between about 80 weight percent to about 99 weight percent of the electrode active material.

* * * * *